US011476484B1

United States Patent
Roychoudhury et al.

(10) Patent No.: US 11,476,484 B1
(45) Date of Patent: Oct. 18, 2022

(54) THERMALLY INTEGRATED HOTBOX COMBINING A STEAM REFORMER WITH SOFC STACKS

(71) Applicant: PRECISION COMBUSTION, INC., North Haven, CT (US)

(72) Inventors: Subir Roychoudhury, Madison, CT (US); Timothy LaBreche, Woodbridge, CT (US); Saurabh Vilekar, Woodbridge, CT (US); Francesco Macri, Farmington, CT (US)

(73) Assignee: Precision Combustion, Inc., North Haven, CT (US)

( * ) Notice: Subject to any disclaimer, the term of this patent is extended or adjusted under 35 U.S.C. 154(b) by 533 days.

(21) Appl. No.: 16/672,663

(22) Filed: Nov. 4, 2019

Related U.S. Application Data (60) Provisional application No. 62/760,964, filed on Nov. 14, 2018.

(51) Int. Cl.
*H01M 8/0612* (2016.01)
*H01M 8/1246* (2016.01)
*H01M 8/04007* (2016.01)
*H01M 8/2475* (2016.01)
*H01M 8/04014* (2016.01)
*B01J 19/00* (2006.01)
(Continued)

(52) U.S. Cl.
CPC ........... *H01M 8/0618* (2013.01); *B01J 19/00* (2013.01); *B01J 23/74* (2013.01); *H01M 8/04014* (2013.01); *H01M 8/04037* (2013.01); *H01M 8/1246* (2013.01); *H01M 8/2475* (2013.01); *H01M 2008/1293* (2013.01)

(58) Field of Classification Search
CPC ........... H01M 8/0618; H01M 8/04014; H01M 8/04037; H01M 8/1246; H01M 8/2475; H01M 2008/1293; B01J 19/00; B01J 23/74
See application file for complete search history.

(56) References Cited

U.S. PATENT DOCUMENTS 5,051,241 A 9/1991 Pfefferle
5,763,114 A 6/1998 Khandkar
(Continued)

FOREIGN PATENT DOCUMENTS

EP 1202366 A2 5/2002
EP 1620909 B1 11/2012

*Primary Examiner* — Cynthia H Kelly
*Assistant Examiner* — Jenna Shulman
(74) *Attorney, Agent, or Firm* — Marie Zuckerman (57) ABSTRACT

A thermally integrated hotbox apparatus combining a steam reformer, a plurality of solid oxide fuel cell (SOFC) stacks, a plurality of oxidant manifolds, and at least one heat extractor. The steam reformer occupies a central position in the hotbox, around which are disposed in spaced-apart relation a plurality of SOFC stacks. A burner may be associated with the steam reformer, either within or outside the hotbox. An oxidant manifold is disposed between each pair of adjacent SOFC stacks. A heat exchanger is incorporated between an SOFC stack and an oxygen manifold. The hotbox design optimally captures thermal heat from the SOFC stacks for use in producing steam and operating the endothermic steam reformer. The apparatus reduces duty cycle of the burner, which produces heat and steam needed for operation of the endothermic steam reformer.

10 Claims, 5 Drawing Sheets

(51) Int. Cl.
*B01J 23/74* (2006.01)
*H01M 8/12* (2016.01)

(56) References Cited

U.S. PATENT DOCUMENTS

| | | |
|---|---|---|
| 6,156,444 A | 12/2000 | Smith |
| 6,326,095 B1 | 12/2001 | Kneidel |
| 6,328,936 B1 | 12/2001 | Roychoudhury |
| 6,641,625 B1 | 11/2003 | Clawson |
| 6,746,657 B2 | 6/2004 | Castaldi |
| 6,835,354 B2 | 12/2004 | Woods |
| 6,986,797 B1 | 1/2006 | Clawson |
| 7,066,973 B1 | 6/2006 | Bentley |
| 7,141,092 B1 | 11/2006 | Roychoudhury |
| 7,524,572 B2 | 4/2009 | Venkataraman |
| 7,976,594 B2 | 7/2011 | Roychoudhury |
| 8,444,951 B2 | 5/2013 | Roychoudhury |
| 10,411,281 B1 | 9/2019 | Vilekar |
| 2002/0152681 A1 | 10/2002 | Oh |
| 2003/0061764 A1 | 4/2003 | Benallal |
| 2009/0042068 A1* | 2/2009 | Weingaertner ...... H01M 8/0612 429/414 |
| 2011/0061299 A1 | 3/2011 | Roychoudhury |
| 2012/0178003 A1* | 7/2012 | Venkataraman .. H01M 8/04007 429/408 |
| 2014/0017583 A1* | 1/2014 | Roychoudhury ... H01M 8/0618 429/425 |
| 2020/0106110 A1* | 4/2020 | Brown ................. H01M 8/248 |
| 2020/0119370 A1* | 4/2020 | Ashary ............ H01M 8/04022 |

\* cited by examiner

THERMALLY INTEGRATED HOTBOX COMBINING A STEAM REFORMER WITH SOFC STACKS

CROSS-REFERENCE TO RELATED APPLICATIONS

This application claims benefit of U.S. Provisional Application No. 62/760,964, filed Nov. 14, 2018.

FIELD OF THE INVENTION

This invention pertains to a thermally integrated hotbox apparatus that combines a steam reformer with a group of solid oxide fuel cell stacks.

BACKGROUND OF THE INVENTION

A solid oxide fuel cell (SOFC) stack operating at high temperatures of about 550° C. to 850° C. provides an overall fuel to electric efficiency of about 40 to 50 percent, which results in a significant production of excess or waste heat. As known in the art, the term "SOFC stack" refers to a structure comprising a plurality of individual solid oxide fuel cell repeat units electrically connected in series. Each individual solid oxide fuel cell repeat unit comprises an oxygen electrode (cathode) wherein oxygen is reduced with a flow of electrons to oxide ions; a solid oxide electrolyte that transports oxide ions so produced at the cathode to a fuel electrode; the fuel electrode (anode) wherein the oxide ions and a fuel, such as hydrogen, carbon monoxide or a mixture thereof, are contacted to produce, respectively, water, carbon dioxide, or a mixture thereof with concomitant production of electrons; and an external electrical circuit that collects the electrons so produced and delivers them to the cathode while also being available for performing useful work. In SOFC systems at least one stack or more are disposed within a structural housing referred to as a "stack hotbox". Recuperating the waste or excess heat from the environs around the stack(s) but defined within the stack hotbox would enable higher fuel to electric efficiency.

The SOFC stack operates on a fuel source comprising hydrogen, carbon monoxide, or a mixture thereof. Hydrogen and carbon monoxide can be supplied to the stack via a steam reformer (SR) wherein a hydrocarbon fuel, such as natural gas or methane or diesel, is contacted with steam and converted in an endothermic process into a synthesis gas (syngas) comprising a mixture of hydrogen and carbon monoxide and lesser quantities of carbon dioxide and water. The heat required for the endothermic steam reforming is typically generated in an associated burner module, wherein a portion of the hydrocarbon fuel is combusted thereby generating the heat needed for the steam reformer.

Advantages would be achieved if the waste heat radiating from any SOFC stack could be removed from the environs of the stack and utilized in a productive manner. Actively removing the waste heat from the stack would lower the temperature of the stack hotbox, which in turn would beneficially result in slower degradation and improved durability of the individual solid oxide fuel cell repeat units. Likewise, a lower temperature of the stack hotbox would advantageously lower requirements for cathode air flow into the SOFC due to reduced cooling needs, which has the advantage of reducing pressure on seals, pumping loads, and system parasitics. Moreover, it would be advantageous to achieve a fuel utilization of greater than about 80 percent in the stack with complementary removal of increased heat.

Any improvement in stack fuel utilization, however, is tied to improved thermal management of the steam reformer. Specifically, it would be advantageous to recover waste heat from the SOFC stack for use in generating the steam and heat needed to satisfy the heat requirements of the steam reformer.

The skilled person will appreciate that the thermal integration of the steam reformer with the SOFC stack(s) is challenging. Both the steam reformer and the SOFC stack(s) have their own array of inlet and outlet manifolds. Moreover, the integrated hotbox would require connecting appropriately designed manifolds between the stream reformer and the SOFC stack(s). Typically, the inlet and outlet manifolds are constructed of metallic parts; while each SOFC stack is constructed of layers of ceramics. Seals and contacts between metallic and ceramic parts can be problematical, due to differences in thermal expansion and heat transfer, thereby leading to stack failure under operating conditions. In a well-integrated hotbox, the number of connecting manifolds should be minimized. Moreover, seals and contacts between metals and ceramics should be minimized so as increase construction durability and heat integration.

SUMMARY OF THE INVENTION

The invention described herein provides for a novel hotbox apparatus integrating a steam reformer with a plurality of solid oxide fuel cell stacks, so as to provide for improved thermal integration. Thus, the thermally integrated hotbox apparatus of this invention comprises:

(a) a steam reformer comprising (i) a fuel inlet and a steam inlet, (ii) a reforming zone disposed in fluid communication with the fuel and steam inlets; and (iii) a reformer outlet disposed in fluid communication with the reforming zone;

(b) a plurality of solid oxide fuel cell stacks disposed around the steam reformer, further disposed in spaced apart relation to each other and to the steam reformer;

(c) wherein each solid oxide fuel cell stack comprises a stack fuel inlet disposed in fluid communication with the reformer outlet, and further comprises a fuel exhaust outlet; further wherein both the stack fuel inlet and the fuel exhaust outlet are disposed in fluid communication with a fuel side of each of the plurality of solid oxide fuel cell stacks;

(d) a plurality of oxidant manifolds disposed around the steam reformer, such that each oxidant manifold is disposed in between a pair of adjacent fuel cell stacks;

(e) wherein the plurality of oxidant manifolds alternatingly comprise an oxidant inlet but no oxidant outlet; and wherein a remaining plurality of oxidant manifolds having no oxidant inlet comprise an oxidant outlet; and further wherein each oxidant manifold defines an interior plenum fluidly communicating with an oxidant side of each of the plurality of fuel cell stacks; and (f) at least one heat extractor disposed in between one of the solid oxide fuel cell stacks and its adjacent oxidant manifold; the at least one heat extractor having a water inlet and a steam outlet, wherein the steam outlet is disposed in fluid communication with the steam inlet to the steam reformer.

The hotbox apparatus of this invention thermally integrates a plurality of solid oxide fuel cell stacks with a steam reformer, and with a plurality of oxidant manifolds, and with at least one heat extractor. The hotbox apparatus of this invention "taken as a whole" offers improved efficiency of function. Specifically, the hotbox apparatus described herein streamlines design of the fuel and oxidant manifolds, their inlets, and their outlets to a small number of repeatable units. The design permits optimal capture of excess stack heat and results in a uniform temperature distribution around the stack, while allowing stack seals to maintain an advantageously reduced temperature. Moreover, each stack desirably then maintains a similar electrical power ensuring improved balanced load distribution and improved lifetime for the entire SOFC system. The design advantageously reduces contact areas between ceramic and metallic parts. Additionally, the design reduces or avoids the duty cycle under steady state operating conditions of any burner disposed internal or external to the hotbox, which might be associated with the steam reformer. The design of this invention results in a more compact hotbox having a greater ease of manufacture, a higher efficiency, and an improved longevity through overall hotbox construction durability.

DETAILED DESCRIPTION OF THE INVENTION

In one embodiment, this invention provides for a novel thermally integrated hotbox defined by a hotbox housing comprising the following components:
(a) a steam reformer disposed at a center of the hotbox, the steam reformer comprising (i) a fuel inlet and a steam inlet, (ii) a reforming zone disposed in fluid communication with the fuel and steam inlets; (iii) a reformer outlet disposed in fluid communication with the reforming zone;
(b) a burner disposed in thermal communication with the steam reformer;
(c) a plurality of solid oxide fuel cell stacks disposed around the steam reformer, in spaced apart relation to each other and to the steam reformer;
(d) wherein each solid oxide fuel cell stack comprises a stack fuel inlet disposed in fluid communication with the reformer outlet, and further comprises a fuel exhaust outlet; further wherein both the stack fuel inlet and the fuel exhaust outlet fluidly communicate with a fuel side of each of the plurality of solid oxide fuel cell stacks;
(e) a plurality of oxidant manifolds disposed around the steam reformer, such that each oxidant manifold is disposed in between a pair of adjacent fuel cell stacks;
(e) wherein the plurality of oxidant manifolds alternatingly comprise an oxidant inlet but no oxidant outlet; and wherein a remaining plurality of oxidant manifolds with no oxidant inlet comprise an oxidant outlet; and further wherein each oxidant manifold defines an interior plenum fluidly communicating with an oxidant side of each of the plurality of fuel cell stacks; and
(f) at least one heat extractor disposed in between one of the solid oxide fuel cell stacks and its adjacent oxidant manifold; the at least one heat extractor having a water inlet and a steam outlet, wherein the steam outlet is disposed in fluid communication with the steam inlet to the steam reformer.

In one embodiment of this invention, connections between each fuel cell stack and each adjacent oxidant manifold are made solely at the edges of the stack and the edges of the oxidant manifold. No connections are made on adjacent faces of the stack and the oxidant manifold.

In another embodiment of this invention, a steam reforming catalyst is disposed within the reforming zone, the steam reforming catalyst comprising a porous substrate having an ultra-short-channel-length and having a Group VIII metal deposited thereon.

Figure 1:
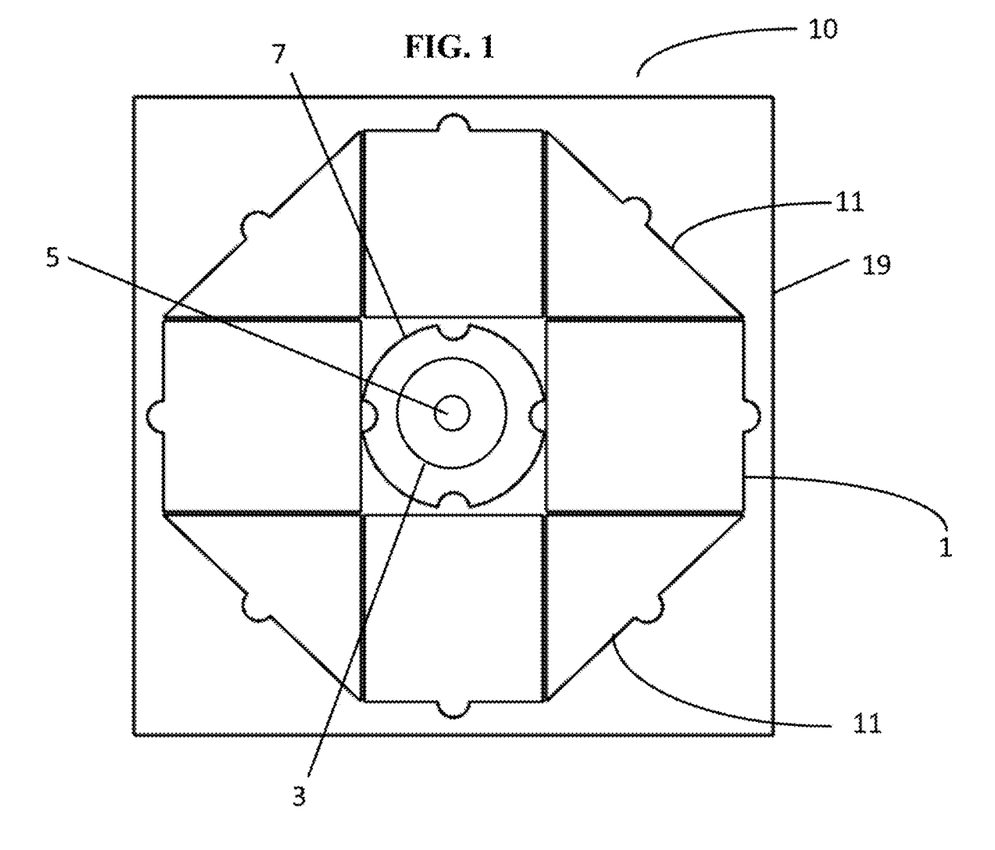
FIG. 1 depicts a top and closed view of an embodiment of the thermally integrated hotbox apparatus of this invention.

FIG. 1 illustrates, from a top closed view, an embodiment of the thermally integrated hotbox (10) of this invention. Within a hotbox housing (19) are disposed four SOFC stacks (1), located on opposite ends of two perpendicular axes (e.g., x, y), spaced apart around a centrally-located steam reformer (3) comprising a fuel inlet (5). Between each pair of adjacent SOFC stacks (1) is disposed an oxidant manifold (11). Four such manifolds are seen. FIG. 1 illustrates that the four fuel cells (1) and the four oxidant manifolds (11) are seamed at their edges (17, bold lines) to form a solid body.

Figure 2:
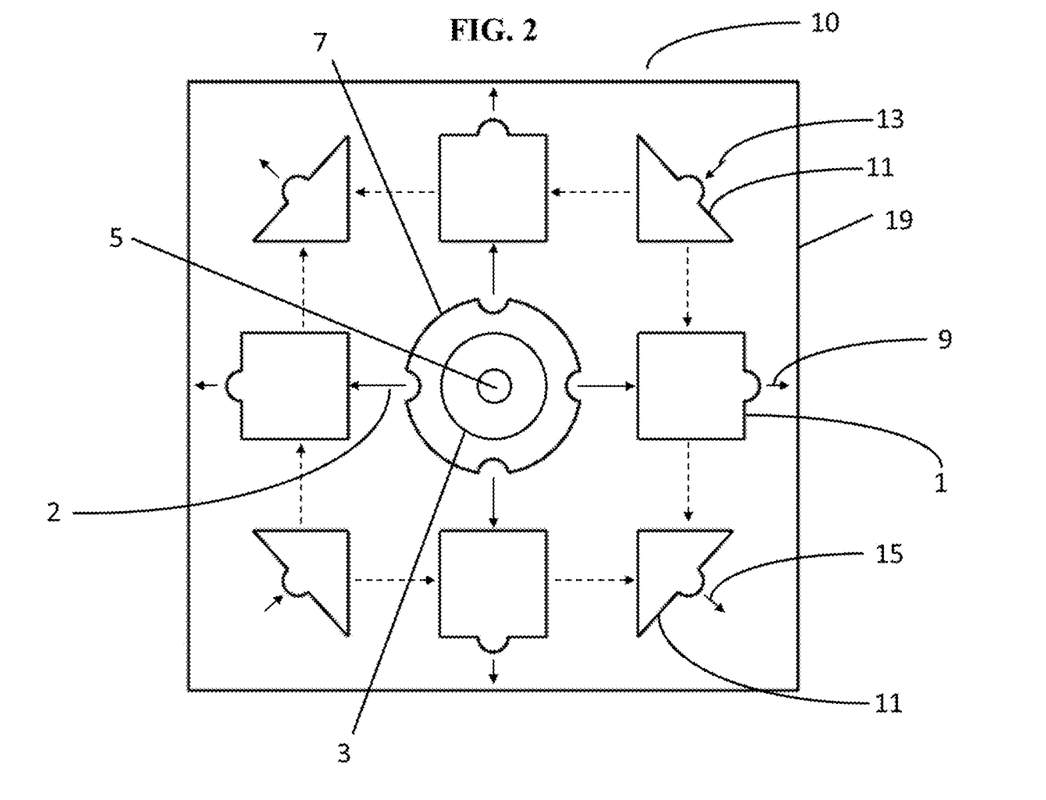
FIG. 2 depicts a top and pulled-apart view of the embodiment of the invention illustrated in FIG. 1.

FIG. 2 depicts the embodiment of the thermally integrated hotbox (10) of FIG. 1, as illustrated from a top, pulled-apart view. The hotbox housing (19) containing the steam reformer (3), four solid oxide fuel cell stacks (1), and four oxidant manifolds (11) are disposed again in the manner shown in FIG. 1. A reformer outlet (2) from the steam reformer (3) fluidly connects the stream reformer (3) to each SOFC stack (1); such that reformate is fed as a stack fuel to the stacks (1), specifically to the anode (fuel electrode) side of each stack. Each fuel cell stack (1) includes an anode waste (fuel exhaust) outlet (9) exiting from the anode side of the stack. In this view, solid arrows (13, 15) at the oxygen manifolds (11) indicate the flow of oxidant into and out in alternating order, such that inlets (13) provide for a flow of oxidant into the manifolds (11) and outlets (15) provide for a flow of waste oxidant from the alternating manifolds (11). The dashed arrows indicate the oxidant flows, from one oxidant manifold (11) through the cathode (oxidant electrode) side of the adjacent SOFC stacks (1) and then passing through and out of the next-neighboring oxidant manifolds (11). At least one heat extractor (7) is positioned in between a fuel cell stack (1) and an oxidant manifold (11), the heat extractor (7) fluidly connected to the steam inlet of the steam reformer (3).

Figure 3:
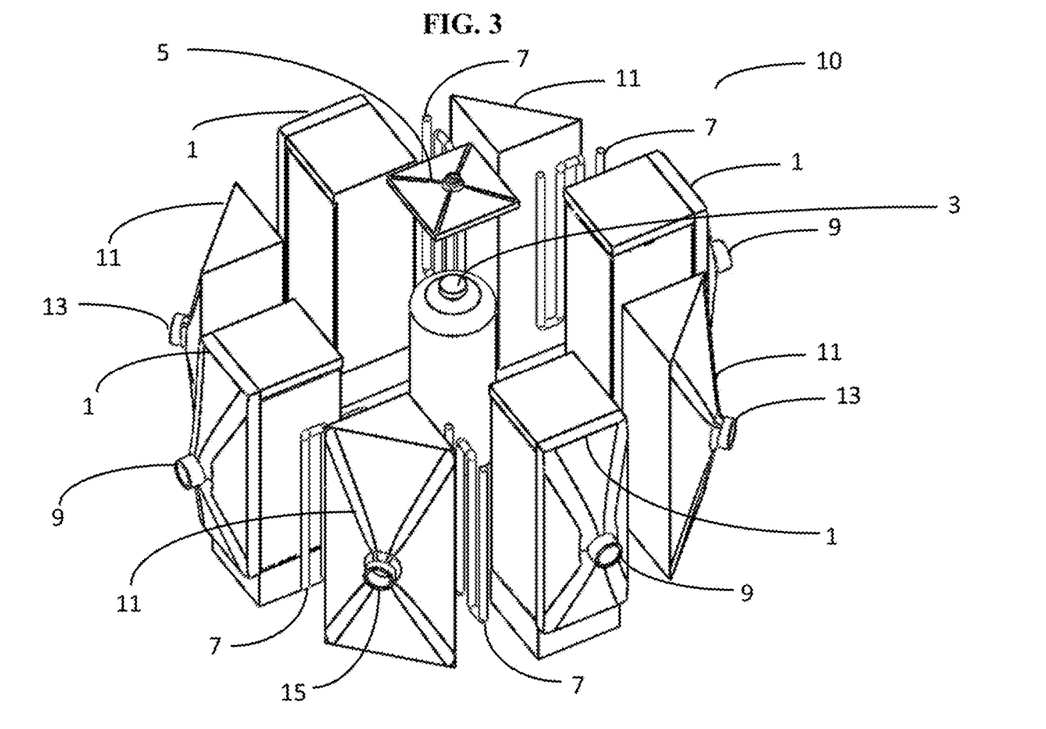
FIG. 3 illustrates in isometric and pulled-apart view an embodiment of the thermally integrated hotbox apparatus of this invention.

FIG. 3 depicts the embodiment of FIG. 1 in isometric, pulled apart view and absent the housing. Again, four solid oxide fuel cell stacks (1) are disposed on opposite ends of two perpendicular axes (e.g., x, y), spaced apart around a centrally-located steam reformer (3). A reformer fuel inlet (5) feeds a hydrocarbon fuel into the steam reformer (3). A reformer outlet (not visible) fluidly connects the steam reformer (3) to each fuel cell stack (1), particularly, to the fuel electrode (anode) side of each fuel cell stack (1). Each fuel cell stack (1) includes a fuel exhaust outlet (9). Between each solid oxide fuel cell stack (1) is disposed an oxidant manifold (11), one between each adjacent pair of fuel cell stacks (1). Alternatingly, the oxidant manifolds (11) include an oxidant inlet (13) or an oxidant outlet (15). At least one heat extractor (7) is positioned between a fuel cell stack (1)

and an oxidant manifold (11) with a steam outlet (not shown) connecting to the steam inlet to the reformer (3).

Figure 4:
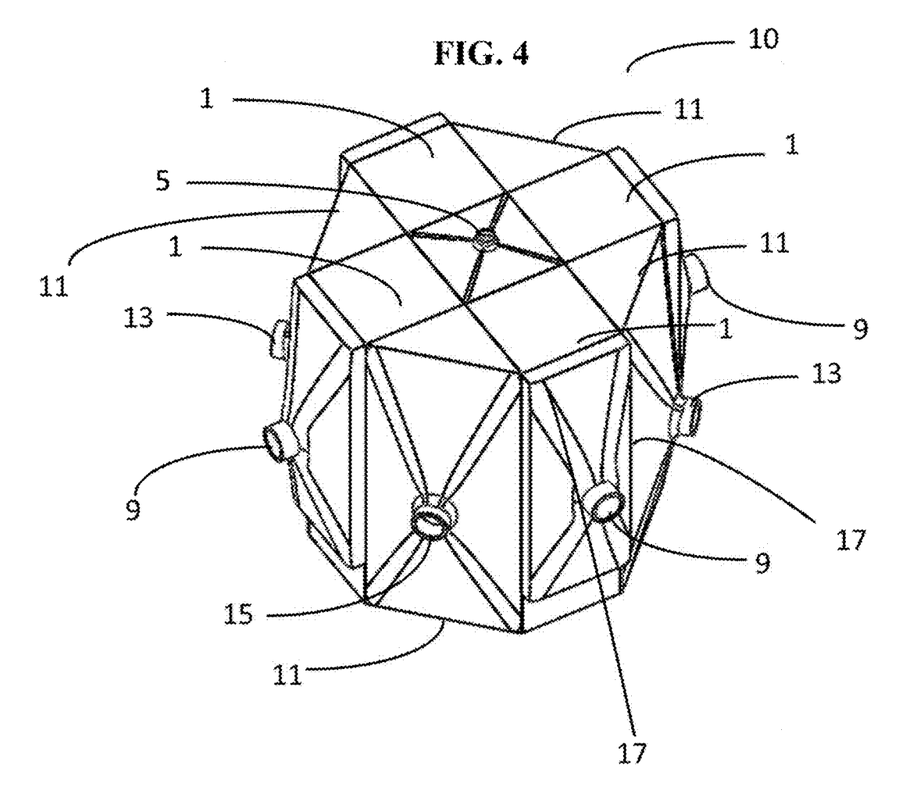
FIG. 4 illustrates in isometric view an embodiment of the fully-assembled thermally integrated hotbox apparatus depicted in FIG. 3.

With reference to FIG. 4, there is depicted an isometric exterior view of a fully assembled hotbox unit (10) absent the housing, but as seen containing four solid oxide fuel cell stacks (1) disposed around a centrally-located steam reformer having a fuel inlet (5). Each fuel cell stack (1) includes a fuel exhaust outlet (9). Between each adjacent pair of solid oxide fuel cell stacks (1) is disposed an oxidant manifold (11). The oxidant manifolds (11) include in alternating order an oxidant inlet (13) and oxidant outlet (15). The fully assembled hotbox (10) is provided with seals and connections (17) only along seams wherein edges of each fuel cell stack (1) contacts edges of adjacent oxidant manifolds (11).

Figure 5:
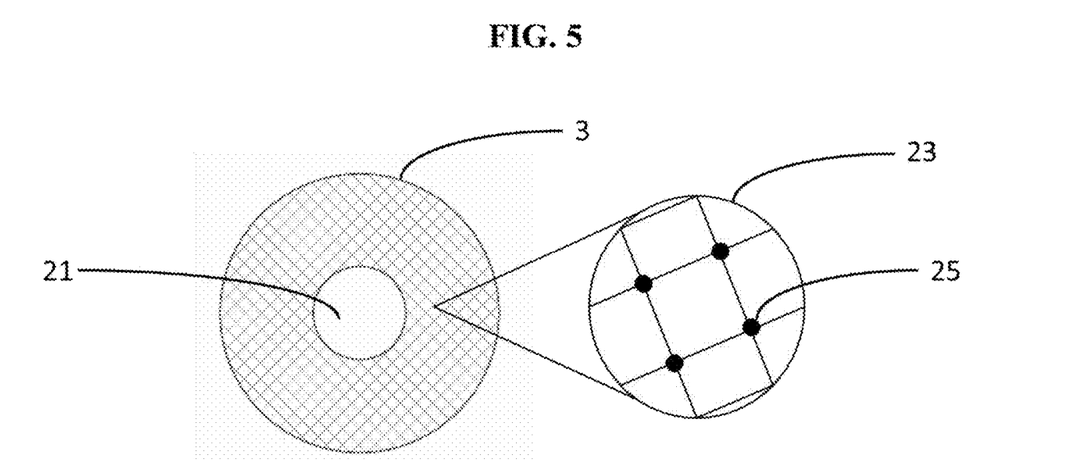
FIG. 5 illustrates in transverse horizontal view one embodiment of a mesh substrate employable in a stream reformer suitable for the apparatus of this invention.

FIG. 5 depicts in horizontal transverse view an embodiment of a reformer (3) and an associated burner (21) that are suitably employed in the integrated hotbox of this invention. In this embodiment, the burner (21) occupies a cylindrical core around which an annular-shaped steam reformer (3) is disposed. The reformer (3) comprises a mesh substrate (23), preferably, of ultra-short-channel-length as detailed hereinafter, onto which is supported (for example, coated) particles of a reforming catalyst (25).

The thermally integrated hotbox of this invention comprises a hotbox housing constructed in any size and shape convenient to house all components including a steam reformer, a plurality of SOFC stacks, a plurality of oxidant manifolds, at least one heat exchanger, optionally a burner, and then various inlets, outlets, and conduits associated with the aforementioned components. Materials of construction of the hotbox housing, the inlets, outlets, and conduits associated therewith should be capable of withstanding temperatures to which each component is exposed, such temperature usually ranging from greater than about 600° C. to less than about 1,000° C. Suitable non-limiting materials of construction include, for example, nickel-chromium alloys and nickel-chromium-iron alloys, such as INCONEL® brand, HASTELLOY® brand, and HAYINES® brand of alloys. The hotbox housing is typically lined on interior and/or exterior surfaces with a thermal insulator, as is known to the skilled person; the insulator substantially retaining heat within the hotbox without undue thermal losses to the external environs.

In the unique design of this invention, the steam reformer is disposed at the interior center of the hotbox, around which the SOFC stacks and oxidant manifolds are disposed. From placement within the stack hotbox, the reformer also benefits from being in thermal communication with each stack. In this manner, the steam reformer captures excess stack heat via radiation and convection. The steam reformer is adapted with an inlet to input a hydrocarbon fuel, an inlet to input steam, and optionally an inlet to input an oxidant, preferably air or oxygen. In the case of a liquid hydrocarbon fuel, it is desirable to atomize the fuel so as to minimize coke formation within the reformer. In one embodiment, an atomizer is disposed external to the hotbox, and a conduit for feeding an atomized liquid fuel is provided from the externally located atomizer to the fuel inlet of the reformer. In another embodiment, an atomizer is located within the hotbox, preferably, as a component of the steam reformer such that under operating conditions the liquid fuel is atomized and vaporized utilizing excess heat from the stack.

In one embodiment, the steam reformer operates on a mixture predominantly comprising the hydrocarbon fuel and steam, with little or no oxidant, in an endothermic steam reforming process. Typically, a burner is integrated with the reformer in a combined steam reformer-burner module, for the purpose of combusting a separate input of hydrocarbon fuel or combusting a fuel exhaust gas derived from the SOFC stacks, thereby providing heat via combustion to drive the endothermic steam reforming process. In one embodiment, the burner provides a primary source of heat to the reformer; whereas heat from the stacks provides a secondary source of heat to the reformer, due to positioning the reformer within the hotbox as well as capturing excess stack heat in the heat extractor to produce or heat steam for the reformer. This embodiment beneficially allows for high stack fuel utilization, which results in a fuel exhaust gas from the stacks that is depleted in heat content and is not entirely sufficient to drive the endothermic steam reformer by itself. Excess stack heat of the secondary heat source provides the thermal balance for the reformer in such cases. In another embodiment, the burner is fed with a separate input of hydrocarbon fuel, when needed, to balance overall system requirements, for example, when the stacks are operating during startup or at high fuel utilization, e.g., greater than about 80 percent fuel utilization. The burner also functions as a start-up burner providing heat for raising the system components to their desired operating temperature(s), particularly, as that pertains to the reforming catalyst and the SOFC stacks. Thus, the burner is utilized during start-up, transients and steady state operation, as desired.

In another embodiment, the steam reformer operates on supplies of a hydrocarbon fuel, steam, and oxidant in an autothermal reforming (ATR) process. This embodiment functions exothermically with release of heat. By cycling excess stack heat to the ATR process via radiation and convection as well through steam generation in the heat extractors, the oxidant requirement of the ATR process is reduced. This advantageously results in an increased thermal efficiency of the steam reformer and a reduced dilution of the reformate stream exiting the reformer. As another option, the steam reformer can be operated under ATR conditions during a start-up phase of the SOFC stacks. During the start-up phase, the temperature of all components including the SOFC stacks and the reforming catalyst must be raised to steady-state operating temperatures. Thus, the exothermic nature of ATR operation provides heat to cold-start the system components. After steady-state temperatures are reached, the steam reformer is advantageously converted to endothermic steam reforming status, wherein heat generated by the stacks is recuperated for use in the heat extractors and the reformer. The burner, which is needed during endothermic steam reforming, can also be utilized to generate heat during start-up.

The steam reformer employed in this invention comprises any steam reformer as known and described in the art. Generally, the steam reformer comprises a fuel inlet, a steam inlet, and a catalytic reaction zone having disposed therein a substrate onto which a reforming catalyst is supported. Non-limiting examples of suitable substrates include powders, pellets, extrudates, foams, and meshes. In one advantageous embodiment, the substrate is provided as a mesh constructed in the form of a reticulated net or screen comprising a plurality of pores, cells, or channels having an ultra-short-channel-length, as defined hereinafter. FIG. 5 depicts in horizontal transverse view a steam reformer (3) and a burner (21) arranged as two concentric cylinders, the burner (21) occupying the inner cylindrical space and the reformer occupying an annular outer space. The reformer (3) comprises a mesh substrate (23) comprising an array of struts (27) and a plurality of void volumes (29), the struts having supported thereon particles of catalyst (25). In one embodiment, the mesh is provided in a coiled configuration of cylindrical shape having an inner diameter and a larger outer diameter such that reactants flowing there through move along a radial flow path from an inlet along the inner diameter to an outlet along the outer diameter. In another embodiment, the mesh is provided as a stack of planar sheets with an inlet at one end of the stack and an outlet at an opposite end of the stack. In any configuration the bulk configuration of the mesh provides for a plurality of void volumes in random order, that is, empty spaces having essentially no regularity along the flow path from inlet to outlet. The mesh substrate is suitably constructed from a metal mesh, a ceramic mesh, or a combination thereof as in a cermet.

In more specific embodiments, the metal mesh substrate is constructed from any thermally conductive metal or alloy capable of withstanding the temperatures and chemical environment to which the substrate is exposed. Suitable non-limiting materials of construction include iron-chromium alloys, iron-chromium-aluminum alloys, and iron-chromium-nickel alloys. Such metal meshes are available commercially, for example, from Alpha Aesar and Petro Wire & Steel. In one exemplary embodiment, the metal mesh comprises a MICROLITH® brand metal mesh (Precision Combustion, Inc., of North Haven, Conn., USA). As described in U.S. Pat. Nos. 5,051,241 and 6,156,444, incorporated herein by reference, MICROLITH® brand mesh technology offers a unique design combining an ultra-short-channel-length with low thermal mass in one monolith, which contrasts with prior art monoliths having substantially longer channel lengths as noted hereinafter.

With reference to a ceramic mesh substrate, the term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing layers of ultra-short-channel-length ceramic mesh comprising woven silica, both patents incorporated herein by reference. With reference to a cermet substrate, the term "cermet" refers to a composite material comprising a ceramic in combination with a metal, the composite being typically conductive while also exhibiting a high resistance to temperature, corrosion, and abrasion in a manner similar to that of ceramic materials.

The mesh substrate is not limited by any method of manufacture; for example, meshes can be constructed via weaving or welding fibers, or by an expanded metal technique as disclosed in U.S. Pat. No. 6,156,444, incorporated herein by reference, or by 3-D printing, or by a lost polymer skeleton method.

In a preferred embodiment, the substrate employed in the stream reformer of this hotbox invention comprises the aforementioned MICROLITH® brand mesh of ultra-short-channel-length (Precision Combustion, Inc., North Haven, Conn., USA). Generally, the mesh comprises short channel length, low thermal mass monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). In this invention the term "channel length" is taken as the distance along one pore or channel as measured from an inlet on one side of the mesh sheet to an outlet on another side of the mesh sheet. This measurement is not to be confused with the overall length of flow path through the entire substrate from an inlet at the inner diameter, for example, of the coiled mesh to an outlet at the outer diameter of the coiled mesh. In another embodiment, the length of the pore, cell, or channel is no longer than the diameter of the elements from which the mesh is constructed; thus, the channel length may range from 25 μm (0.001 inch) up to about 100 μm (0.004 inch). Generally, the channel length is no longer than about 350 μm (0.014 inch). In view of this ultra-short channel length, the contact time of reactants with the mesh and catalyst supported thereon advantageously ranges from about 5 milliseconds (5 msec) to about 350 msec. The MICROLITH® brand ultra-short-channel-length mesh typically comprises from about 100 to about 1,000 or more flow channels per square centimeter.

More specifically, each layer of mesh in this invention typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1.

The MICROLITH® brand mesh having the ultra-short-channel-length facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the mesh substrate of this invention avoids boundary layer buildup. Since heat and mass transfer coefficients depend on boundary layer thickness, avoiding boundary layer buildup enhances transport properties. Employing the ultra-short-channel-length mesh, such as the MICROLITH® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference. The preferred MICROLITH® brand mesh of ultra-short-channel-length also advantageously provides for a light-weight portable size, a high throughput, thorough mixing of reactants passing there through, a high one-pass yield of hydrogen-containing reformate, a low yield of coke and coke precursors, and an acceptably long catalyst lifetime, as compared with alternative substrates, such as, ceramic monolith and pelleted substrates.

The substrate disposed within the reforming zone of the steam reformer supports a reforming catalyst, which under operating conditions functions to facilitate steam reforming or autothermal reforming, as desired. A suitable reforming catalyst comprises one or more metals of Group VIII of the Periodic Table of the Elements, including iron, cobalt, nickel, ruthenium, rhodium, palladium, osmium, iridium, platinum, and mixtures thereof. The catalyst chosen depends upon the particular fuel fed to the reformer. Gaseous fuels, such as methane, are suitably reformed with a nickel catalyst as known in the art. Liquid fuels, such as diesel, are suitably reformed with one or a mixture of platinum group metals (PGM, e.g., Ru, Rh, Pd, Os, Ir, Pt. and mixtures thereof). The deposition of catalytic metal(s) onto the metal mesh is implemented by methods well known in the art. Alternatively, finished catalysts comprising catalytic metal(s) supported on the MICROLITH® brand mesh substrate are available from Precision Combustion, Inc., North Haven, Conn.

In another exemplary embodiment, the mesh is constructed of an analogous structure of metal, ceramic, or other manufactured or structured ultra-short-channel-length substrate material comprising an interconnected network of solid struts defining a plurality of pores of an open-cell configuration. In this embodiment, the pores have any shape or diameter; but typically, a number of pores that subtend one inch designate a "pore size," which for most purposes ranges from about 5 to about 80 pores per inch. The relative density of such structures, taken as the density of the structure divided by the density of solid parent material of the struts, typically ranges from about 2 to about 15 percent. Manufactured or structured ultra-short-channel-length substrates are commercially available in a variety of materials capable of withstanding the operating temperatures of the steam reformer and SOFC of this invention.

The reformer further comprises one or more inlets for feeding to the catalytic reforming zone the hydrocarbon fuel, steam, and optionally an anode tail gas exhausted from the anode side of the SOFC stack(s). In another embodiment, an oxidant is additionally fed to the reformer. In yet another feature, the reformer further comprises a reformer outlet for exiting a reformate stream comprising predominantly hydrogen and carbon monoxide, the reformate stream passing into the fuel side of each of the solid oxide fuel cell stacks. The inlets and outlets of the reformer are conventional in design and constructed from any suitable material capable of withstanding the temperature and chemicals to which the material is exposed.

The steam reformer is typically associated with a burner, which functions to burn a portion of the hydrocarbon fuel, or a separate source of fuel, such as the anode tail gas exhausted from the SOFC stack(s), or a mixture thereof to provide internal heat to drive the reformer. In one embodiment, the burner is disposed as an integral unit of the steam reformer; for example, the reformer-burner unit comprises two concentric tubes in direct conductive thermal communication, such as in a shell-in-tube reactor design. In this embodiment, the inner tube accommodates the burner; while the outer annular volume accommodates the steam reformer, as illustrated in FIG. 5. In another embodiment, the functions are reversed, such that the inner tube accommodates the steam reformer; while the outer tube accommodates the burner. In yet another embodiment, the burner is disposed within the hotbox housing in spaced apart relation to the steam reformer. In yet another embodiment, the burner is positioned exterior to the hotbox housing. In each embodiment, the burner is required to be in thermal communication with the steam reformer, so that heat generated in the burner is used to produce steam for the steam reformer and used to drive the endothermic steam reforming process.

The burner is suitably provided by any conventional flame-stabilized or flameless, catalytic or non-catalytic burner design as known in the art. The burner comprises a housing defining a combustion zone or chamber, one or more inlets for feeding to the combustion zone the oxidant and the hydrocarbon fuel, the anode tail gas, or a mixture thereof; and an outlet for exiting combustion products. The burner typically may also include an ignition device. The chamber itself, the inlets and outlet are conventionally constructed from any material of suitable durability in view of the temperature and chemicals to which the burner is exposed. Suitable non-limiting materials of construction for the burner include, for example, nickel-chromium alloys and nickel-chromium-iron alloys, such as INCONEL®, HASTELLOY®, and HAYNES® brands of alloys. These alloys are appropriately passivated to prevent contamination of components from off-gassing. In one embodiment, an interior chamber of the burner is filled with a combustion catalyst, such as a platinum group metal (PGM) provided in the form of powder, pellets, extrudates, or the like.

Each SOFC fuel cell stack as required of this invention comprises a plurality of individual solid oxide fuel cell repeat units. Each fuel cell repeat unit comprises a sandwich assembly having constituent parts in the following order: a fuel electrode (anode), a solid oxide electrolyte, and an oxygen electrode (cathode), the fuel and oxygen electrodes being connected via an external electrical circuit. Each stack further includes interconnects that connect the fuel electrodes and oxygen electrodes in adjacent cells thereby collecting the current from each cell and delivering the collected currents to the external circuit. The stack also includes bipolar plates, which separate the individual fuel cell repeat units from each other as well as flow manifolds that deliver and distribute the flows of stack fuel and oxygen to their respective electrodes within the stack and remove products from the stack.

The solid oxide fuel cell is an apparatus that in forward operation provides for the electrochemical reaction of a stack fuel, namely hydrogen or carbon monoxide, with an oxidant, such air or oxygen, to produce a DC electrical current and a chemical product, namely, water or carbon dioxide, respectively. In another embodiment, the stack fuel additionally comprises methane. The stack fuel is fed to the fuel electrode (anode at the anode side of the SOFC stack) where it reacts via oxidation with oxide ions to produce the oxidized chemical product, i.e., the water and/or carbon dioxide, and a flow of electrons. The electrons travel via an embedded current collector and the external electrical circuit to the oxygen electrode (cathode at the cathode side of the SOFC stack), where molecular oxygen is reduced to form oxide ions. During transit the electrons are available to do useful work. The oxide ions produced at the oxygen electrode diffuse through the solid oxide electrolyte to the fuel electrode to complete the chemical reaction.

The art describes many embodiments of solid oxide fuel cell repeat units, any of which is suitably employed in this invention. As a non-limiting exemplary embodiment, the solid oxide electrolyte comprises a ceramic that is a good conductor of oxide ions but a poor or nonconductor of electrons, which ensures that the electrons pass through the external circuit. As a non-limiting exemplary embodiment, the solid oxide electrolyte is constructed of a ceramic comprising a yttria-stabilized zirconia (YSZ) sandwiched in between a fuel electrode comprised of a nickel oxide/YSZ cermet and an oxygen electrode comprised of a doped lanthanum manganite. This is only one suitable design which should not limit the invention in any manner.

It should be appreciated that a fuel exhaust stream (anode tail gas) exits each SOFC stack at the anode side fuel exhaust outlet, the exhaust gas comprising, in addition to water and carbon dioxide, any unreacted hydrogen and carbon monoxide. In one exemplary embodiment applied to this invention, the fuel exhaust stream or a portion thereof is recycled to the burner and combusted to generate heat, which is recuperated and utilized to drive the endothermic stream reforming process. In another exemplary embodiment, the fuel exhaust stream or a portion thereof is recycled to the steam reformer, thereby minimizing water needs of the reformer, increasing hydrogen content in the reformate stream, and concomitantly increasing overall system efficiency. In yet another exemplary embodiment, the fuel exhaust stream is split into two flows, one of which is fed to the steam reformer and the other of which is fed to the burner.

In this invention, a plurality of SOFC stacks are employed ranging in number typically from 2 to about 8. It should be appreciated that each SOFC stack employed in this invention is not limited by any size or shape. Typically, each SOFC stack is provided as a tower, preferably, having a transverse cross-section of a square or rectangular shape. In this invention, under operating conditions at high temperatures, each stack radiates heat from all sides thereby raising the temperature of the environs around the stacks within the hotbox. Placement of the reformer at the core of the hotbox and strategic placement of the SOFC's, around the reformer take advantage of the radiant and convective heat available within the stack hotbox.

In another embodiment of this invention, the collective design of solid oxide fuel cells and oxidant manifolds is repeated in a plurality of concentric rings, all disposed within the hotbox. Thus, one could envision FIG. 1 with a second circle of SOFC units (1) and oxidant manifolds (11) disposed around and outside the circle illustrated in FIG. 1. This embodiment envisions each fuel exhaust outlet (9) being fed into an outer ring of stack fuel inlets. Additional stack fuel can be supplied to each SOFC in each outer ring.

A plurality of oxidant manifolds are disposed around the central stream reformer in spaced apart relationship to each other. Generally, one oxidant manifold is disposed in between each pair of adjacent SOFC stacks. The manifold itself comprises a housing defining an interior plenum. As illustrated in FIG. 2, for example, alternate oxidant manifolds (11) are equipped with an inlet (13) for feeding an oxidant gas stream, such as air, into the plenum. The remaining alternating oxidant manifolds (11) are equipped with an oxidant outlet (15) for exiting a gaseous oxidant stream (cathode waste stream) collected from the oxidant electrode of each adjacent stack. The interior plenum fluidly communicates with the oxidant electrode (cathode side) of each adjacent solid oxide fuel cell stack. Each oxidant manifold is constructed from a material capable of withstanding the oxidant atmosphere and the temperature to which the manifold is exposed. Suitable materials of construction include, without limitation, any of those temperature durable metal alloys described hereinbefore.

It should be appreciated that the SOFC stacks and the oxidant manifolds are geometrically designed to fit into a compact modular unit, for example, a three-dimensional polyhedron, as exemplified by the octagonal shape shown in FIGS. 1 and 4. In this design, the SOFC stacks are seamed to the oxidant manifolds only along the exterior edges of each unit; substantially no contacts and seams are found on the faces of the stacks and the oxidant manifolds where ceramics in the stacks are more likely to contact metals of the oxidant manifold. Rather, the design of the invention minimizes contacts and seals between unlike materials of construction. For example, an SOFC stack embedded in a metal casing can be easily seamed to a metal oxidant manifold for long-term durability.

At least one heat extractor is positioned adjacent a fuel cell stack, typically, in in between a fuel cell stack and an adjacent oxygen manifold. Preferably, a plurality of heat extractors is employed; more preferably, from 2 to 4 heat extractors are employed. Each heat extractor functions to capture waste heat from the nearby SOFC stacks and to transfer the captured heat to water or steam flowing there through, resulting in generation of steam or super-heated steam, respectively, for use in the steam reformer. Since water and steam have a high heat capacity, excess heat is efficiently removed in this manner from the stack. The steam so produced is fed into the steam reformer, thereby recuperating excess stack heat to drive the endothermic reforming process while simultaneously reducing the burden of external heat generated in the burner for such purpose.

Each heat extractor is not limited by size or shape. In one exemplary embodiment, the heat extractor is provided as a tube having an inlet on one end and an outlet on another end, or a plurality of such tubes wound in serpentine fashion and connected into a collective inlet and outlet. Each heat extractor is constructed from any material capable of withstanding the temperature to which the heat extractor and its associated inlets and outlets are exposed. The material is required to be essentially non-reactive towards water and steam and also thermally conductive, that is, capable of capturing heat from the stack and its environs. Suitable non-limiting materials of construction for the heat extractor include, for example, nickel-chromium alloys and nickel-chromium-iron alloys, such as INCONEL®, HASTELLOY®, and HAYNES® brands of alloys. Under operating conditions water or low temperature steam is passed through the flow path of each heat extractor.

Under operating conditions the reformer is typically fed a hydrocarbon fuel comprising, for example, any gaseous hydrocarbon existing in a gaseous state at 22° C. and 1 atm pressure (101 kPa), or alternatively, any liquid hydrocarbon that is vaporizable and fed as a vapor to the reformer. Non-limiting examples of suitable gaseous hydrocarbons include methane, natural gas, ethane, propane, butane, biogas, and mixtures thereof. Non-limiting examples of suitable liquid hydrocarbons that are readily vaporized include hexane, octane, gasoline, kerosene, and diesel, biodiesels, jet propulsion fuels and synthetic fuels derived, for example, from Fisher-Tropsch processes, and mixtures thereof. Preferred fuels include methane and natural gas. If employed, the oxidant supplied to the reformer comprises a chemical capable of partially oxidizing the hydrocarbon fuel selectively to a gaseous reformate comprising hydrogen and carbon monoxide (syngas). Suitable oxidants include, without limitation, essentially pure molecular oxygen, mixtures of oxygen and nitrogen, such as air, and mixtures of oxygen and one or more inert gases, such as helium and argon.

During steam reforming operation, the quantities of steam and fuel supplied to the reformer are best described in terms of a steam to carbon ratio (St/C), which is defined as a ratio of number of moles of steam (St) provided per atom of carbon (C) provided in the hydrocarbon fuel. Generally, the St/C ratio is greater than about 2.5:1 and less than about 4.5:1. Usually no oxidant is supplied during steam reforming; however, some oxidant may be supplied if desired. The quantities of hydrocarbon fuel and oxidant supplied during steam reforming are best described in terms of an O:C ratio, wherein "O" refers to atoms of oxygen in the oxidant and "C" refers to atoms of carbon in the fuel. Generally, the O:C ratio of oxidant to fuel fed under steam reforming conditions ranges from 0:1 to about 0.5:1.

The steam reformer operates at a temperature greater than about 500° C. and less than about 1,100° C. A suitable weight hourly space velocity measured at 21° C. and 1 atm (101 kPa) ranges from about 100 liters of combined flow of hydrocarbon fuel, steam, and optional oxidant per hour per gram catalyst (100 L/hr-g-cat) to about 6,000 L/hr-g-cat, which allows for high throughput. The corresponding gas hourly space velocity measured at 21° C. and 1 atm (101 kPa) ranges from about 1,500 liters of combined flow of hydrocarbon fuel, steam, and optional oxidant per hour per liter catalyst (1,500 hr$^{-1}$) to about 100,000 hr$^{-1}$. A reforming efficiency of greater than about 75 percent and, preferably, greater than about 80 percent is achievable relative to the LHV (lower heating value) of the hydrocarbon fuel fed to the reformer. The reformer is capable of operating for greater than about 1,000 hours without indications of coke production and catalyst deactivation.

Under operating conditions, the burner is fed a mixture of an oxidant and a hydrocarbon fuel, or an anode tail gas, or a combination of both, and ignition is provided to initiate combustion. The hydrocarbon fuel and oxidant are selected from any of those identified hereinabove for use with the reformer, with methane or natural gas being the preferred hydrocarbon fuel and air being the preferred oxidant for the burner. The burner is operated under stoichiometric or preferably "fuel-lean" conditions, namely, at an O/C ratio equal to or exceeding a ratio required to convert all carbon and hydrogen atoms in the fuel to carbon dioxide and water.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermally integrated hotbox comprising:
  (a) a steam reformer comprising (i) a fuel inlet and a steam inlet, (ii) a reforming zone disposed in fluid communication with the fuel and steam inlets; and (iii) a reformer outlet disposed in fluid communication with the reforming zone;
  (b) a plurality of solid oxide fuel cell stacks disposed around the steam reformer, further disposed in spaced apart relation to each other and to the steam reformer;
  (c) wherein each solid oxide fuel cell stack comprises a stack fuel inlet disposed in fluid communication with the reformer outlet, and further comprises a fuel exhaust outlet; further wherein both the stack fuel inlet and the fuel exhaust outlet are disposed in fluid communication with a fuel side of each of the plurality of solid oxide fuel cell stacks;
  (d) a plurality of oxidant manifolds disposed around the steam reformer, such that each oxidant manifold is disposed in between a pair of adjacent fuel cell stacks;
  (e) wherein the plurality of oxidant manifolds alternatingly comprise an oxidant inlet but no oxidant outlet; and wherein a remaining plurality of oxidant manifolds having no oxidant inlet comprise the oxidant outlet; and further wherein each oxidant manifold defines an interior plenum fluidly communicating with an oxidant side of each of the plurality of fuel cell stacks; and
  (f) at least one heat extractor disposed in between one of the solid oxide fuel cell stacks and its adjacent oxidant manifold; the at least one heat extractor having a water-steam inlet and a steam outlet, wherein the steam outlet is disposed in fluid communication with the steam inlet to the steam reformer.

2. The thermally integrated hotbox of claim 1 wherein the reforming zone comprises a porous substrate having a reforming catalyst supported thereon.

3. The thermally integrated hotbox of claim 2 wherein the porous substrate comprises an ultra-short-channel length mesh, and the reforming catalyst comprises at least one Group VIII metal of the Periodic Table.

4. The thermally integrated hotbox of claim 1 wherein the steam reformer is integrated with a burner in a shell-in-tube structure.

5. The thermally integrated hotbox of claim 1 wherein the plurality of solid oxide fuel cell stacks number from 2 to about 8.

6. The thermally integrated hotbox of claim 1 wherein the plurality of oxidant manifolds number from 2 to about 8.

7. The thermally integrated hotbox of claim 1 wherein from 2 to 4 heat extractors are employed.

8. The thermally integrated hotbox of claim 1 wherein edges of each solid oxide fuel cell stack are seamed to edges of two adjacent oxidant manifolds, but substantially no seams are disposed on or along faces of the fuel cell stack and the two adjacent oxidant manifolds.

9. The thermally integrated hotbox of claim 1 wherein the plurality of fuel cell stacks and the plurality of oxidant manifolds are designed to fit into a polyhedron shape.

10. A thermally integrated hotbox apparatus comprising a hotbox housing containing the following components comprising:
  (a) a steam reformer comprising (i) a fuel inlet and a steam inlet, (ii) a reforming zone having disposed therein an ultra-short-channel-length mesh substrate having supported thereon a reforming catalyst, the reforming zone being disposed in fluid communication with the fuel and steam inlets; (iii) a reformer outlet disposed in fluid communication with the reforming zone;
  (b) a burner in a shell-in-tube configuration with the steam reformer;
  (c) a plurality of solid oxide fuel cell stacks disposed around the steam reformer, in spaced apart relation to each other and to the steam reformer;
  (d) wherein each solid oxide fuel cell stack is comprised of a plurality of solid oxide fuel cell repeat units, each solid oxide fuel cell repeat unit comprising (i) a fuel electrode, (ii) a solid oxide electrolyte, and (iii) an oxidant electrode; wherein each solid oxide fuel cell stack comprises a stack fuel inlet disposed in fluid communication with the reformer outlet of the steam reformer; and wherein each solid oxide fuel cell stack further comprises an anode tail stream outlet; the stack fuel inlet and the anode tail stream outlet being in fluid communication with the fuel electrode of each of the plurality of fuel cell stacks;
  (e) a plurality of oxidant manifolds disposed around the steam reformer in spaced apart relation to the steam reformer, one oxidant manifold being disposed in between each pair of adjacent fuel cell stacks;
  (f) wherein each of the plurality of oxidant manifolds alternatingly comprises an oxidant inlet but not an oxidant outlet; and wherein a remaining oxidant manifolds comprise the oxidant outlet but no oxidant inlet; and further wherein each oxidant manifold defines an interior plenum that fluidly communicates with the oxidant electrode of each of the plurality of fuel cell stacks; and
  (g) at least one heat extractor disposed in between one of the solid oxide fuel cell stacks and one of the oxidant manifolds; the at least one heat extractor having a water-steam inlet and a steam outlet, the steam outlet fluidly communicating with the steam inlet to the steam reformer.

\* \* \* \* \*